Sept. 26, 1961     H. W. WELSH     3,001,759
ROTOR BLADE LOCK
Filed June 11, 1958
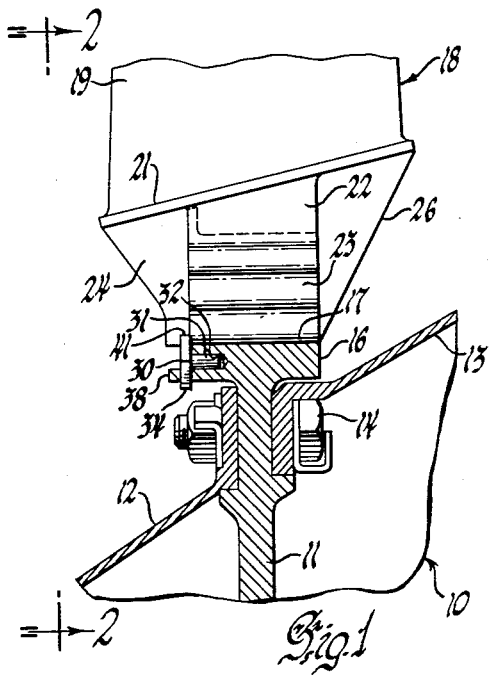
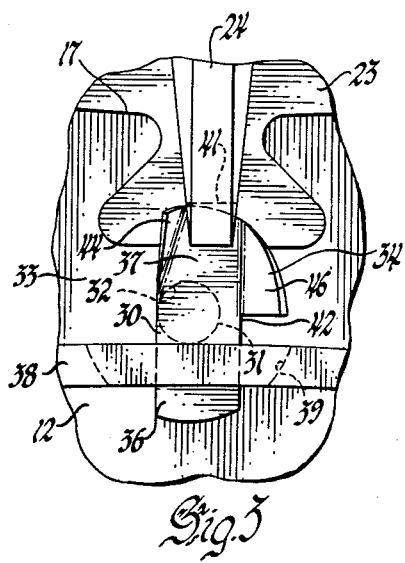
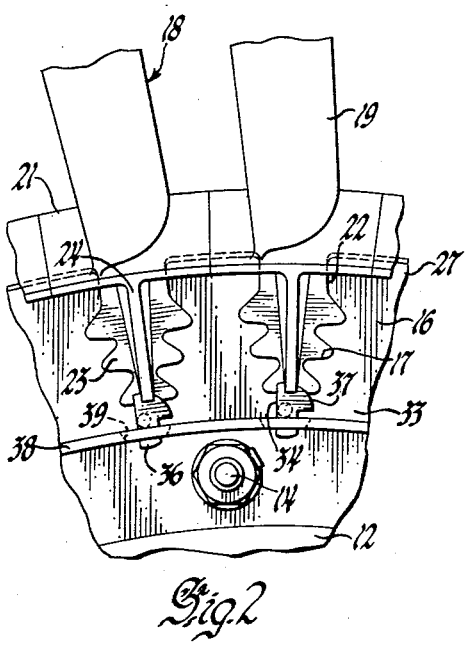
INVENTOR.
Harvey W. Welsh
BY
Paul Fitzpatrick
ATTORNEY United States Patent Office 3,001,759
Patented Sept. 26, 1961

3,001,759
ROTOR BLADE LOCK
Harvey W. Welsh, Indianapolis, Ind., assignor to General Motors Corporation, Detroit, Mich., a corporation of Delaware
Filed June 11, 1958, Ser. No. 741,290
4 Claims. (Cl. 253—77)

My invention relates to blade locks for rotary machines, such, for example, as compressors and turbines. It is customary in such machines to mount a row of blades on the periphery of a disk or other rotor structure by sliding the roots of the blades into dovetail grooves extending more or less axially across a rim or flange on the rotor. Some arrangement must be provided to hold or lock the blades in place in the slots, and many arrangements for this purpose have been proposed.

My invention is directed to a blade lock which is particularly advantageous from the standpoints of positive retention of the blade, ease of application and removal of the lock, light weight, and simplicity of structure leading to manufactuding economies.

The principal objects of the invention are to improve the retention of blades on turbomachine rotors and to provide an improved blade lock for such machines.

The nature of the invention and advantages thereof will be clear to those skilled in the art from the succeeding detailed description and drawings of the preferred embodiment of the invention.

FIGURE 1 is a fragmentary sectional view of an axial flow compressor rotor taken on a plane containing the axis of the rotor.

FIGURE 2 is a fragmentary front elevation view of the same taken on the plane indicated by the lines 2—2 in FIGURE 1.

FIGURE 3 is an enlarged view of a portion of FIGURE 3 showing the blade lock fixed in position.

Referring first to FIGURES 1 and 2 for a description of an illustrative embodiment of the invention, a compressor rotor 10 comprises one or more disks 11, only one of which is shown. The disks may be connected by spacer rings such as 12 and 13 fixed to the disk 11 adjacent the rim thereof by bolts and nuts 14. The disk 11 has a relatively heavy rim or flange 16 in which are cut dovetail slots 17 extending across the rim of the wheel. These slots may be parallel to the axis or may be inclined or skewed with respect to the axis.

A number of rotor blades 18 are mounted on the rim 16 of disk 11. Each blade comprises an airfoil or blade portion 19, a blade platform 21, a stalk 22, and a root 23, the root being configured for mounting in the slot 17. The stalk connects the root to the platform and the airfoil extends outwardly from the platform. The platforms of adjacent blades abut to provide the inner boundary of the flow path through the rotor stage. Webs 24 and 26 extend from the forward and rear faces of the root and stalk to the blade platform. The root 23 and the webs 24 and 26 may be considered to be the mounting portion of the blade, since they serve to mount the airfoil portion on the rotor. An interrupted air baffle flange 27 extends from the rim to close the spaces between the stalks 22. It will be understood that the rotor structure so far described is merely illustrative of one type of rotor structure to which the invention may be applied.

My invention is directed particularly to the blade locking means which locates the blade in the slot and holds it in place. This comprises a retainer 30 including a cylindrical body 31 which is a sliding fit in a hole or bore 32 in the face 33 of the rim. This hole is perpendicular to the face of the rotor and is adjacent the blade root, preferably immediately below the blade slot 17. The retainer has a head 34, which is shown clearly in FIGURE 3, including two portions extending radially from the axis of the body 31 and hole 32. One portion 36 of the head cooperates with the wheel or rotor rim and the other portion 37 cooperates with the blade root. The rim 16 of the wheel includes a flange 38 projecting axially from face 33. A recess 39 is provided in the flange 38 adjacent to each hole 32, preferably provided by a sawcut concentric with the hole 32. Each blade mounting portion also has a recess adjacent the base 33 provided by a notch or groove 41 in the inner edge of the web 24 immediately adjacent the face 33.

The head of the retainer 30 is of the shape of a circle which has been cut away at one side to a straight line approximately tangent to the body 31 and has been notched as indicated at 42 opposite the cut-away side. This leaves the head portion 36 projecting from one side of the head and an approximately one-quarter circular head portion 37 projecting from the other side of the body. The head 34 is flat before the retainer is put in position. To mount the blade, it is slid into the slot 17 on the rotor and then retainer 30 is inserted into the hole 32, the retainer being disposed approximately 90° counterclockwise from the position shown in the drawings so that the flat side of the head clears the flange 38 and the notch 42 clears the web 24. The retainer is then rotated 90° clockwise to the position of FIGURE 3, the head portion 36 entering the recess 39 and the head portion 37 entering the recess 41.

The marginal portions 44 and 46 (FIGURE 3) of the head portion 37 may then be bent forward by any suitable tool so that these portions will engage the sides of web 24 to prevent rotation of the retainer in the hole. Marginal portion 44 may be bent forward before the retainer is applied, as during manufacture of the retainer, if desired.

This retainer is particularly suited to a blade which tends to move rearwardly under the force acting upon it in the operation of the compressor (rearwardly being to the right in FIGURE 1). In this case, the force acting on the blade presses the web 24 against the head of the retainer and thus presses the retainer against the face of the rotor.

It will be apparent from the foregoing that the blade lock of the invention is very simple and light in weight and does not require any involved structure. It is merely necessary that the wheel have a hole for the body of the retainer and provide some sort of abutment for the head portion 36 to hold the retainer against sliding out of the wheel. The retainer itself is a very simple part.

The insertion of the blade and application of the retainer has been described. To remove the retainer it is only necessary to flatten the head portion 46 with a hammer or other tool, rotate the retainer 90° counterclockwise, and remove it from the wheel. It is thus very easy to remove and replace a damaged blade. In such a case, a new retainer should be provided.

It will be apparent that the blade lock is simple, inexpensive, easy to apply and remove, and is of very small weight, characteristics which make it highly suitable for the purpose described in compressors or analogous machines.

The detailed description of the preferred embodiment of the invention for the purpose of explaining the principles thereof is not to be considered as limiting or restricting the invention, since many modifications may be made by the exercise of skill in the art within the scope of the invention.

I claim:
1. A rotor assembly for a turbomachine comprising, in combination, a rotor having a slot in the periphery thereof, a blade mounted in said slot for an axial but non-radial sliding movement relative to said rotor, and retainer means to prevent the axial relative sliding movement between said blade and rotor, said rotor periphery having an opening therein adjacent said slot, said retainer means having a body portion rotatably and slidably mounted in said opening for rotation about the axis of the opening to a plurality of positions and sliding in a plurality of directions, said retainer means also having a plurality of circumferentially spaced head portions extending radially from said body portion, a plurality of engageable means on said blade and said rotor engaging said head portions in one rotative position of said retainer means preventing relative sliding movement in said directions between said blade, retainer means and rotor, rotation of said retainer means to another position disengaging said head portions from said engageable means, one of said head portions being deformable to abut one of said engageable means when said retainer means is in said one rotative position to prevent rotation of said retainer means.

2. A rotor assembly for a turbomachine comprising, in combination, a rotor member having a slot in the periphery thereof, a blade member mounted in said slot for an axial but non-radial sliding movement relative to said rotor member, and retainer means to prevent the axial relative sliding movement between said blade and rotor members, the periphery of said rotor member having an opening therein adjacent said slot, said retainer means having a body portion rotatably and slidably mounted in said opening for rotation about the axis of the opening to a plurality of positions and sliding in a plurality of directions, said retainer means also having a non-circular head portion extending radially from said body portion, a plurality of recesses in said blade and said rotor members each non-slidably containing a part of said head portion therein in one rotative position of said retainer means thereby preventing relative sliding movement in said directions between said retainer means, blade and rotor members, rotation of said retainer means to another position withdrawing said head portion parts from said recesses, one of said parts of said head portion being deformable to abut one of said members when said retainer means is in said one rotative position to prevent rotation of said retainer means.

3. A rotor assembly for a turbomachine comprising, in combination, a rotor having a slot in the periphery thereof, a blade having a mounting portion including a root mounted in said slot for an axial but non-radial sliding movement relative to said rotor, and retainer means to prevent the axial relative sliding movement between said blade and rotor, said rotor periphery having an opening therein adjacent said slot, said retainer means having a body portion rotatably and slidably mounted in said opening for rotation about the axis of the opening to a plurality of positions and sliding in a plurality of directions, said retainer means also having two circumferentially spaced head portions extending radially from said body portion, said blade mounting portion and said rotor each having recesses therein adjacent said opening engaged by one of said head portions in one rotative position of said retainer means preventing relative sliding movement in said directions between said blade, retainer means and rotor, rotation of said retainer means to another position withdrawing said head portions from said recesses, one of said head portions being deformable to prevent entry into or exit out of one recess to thereby prevent rotation of said retainer means.

4. A rotor assembly for a turbomachine comprising, in combination, a rotor having a slot in the periphery thereof, a blade having a mounting portion including a root mounted in said slot for an axial but non-radial sliding movement relative to said rotor, and retainer means to prevent the axial relative sliding movement between said blade and rotor, said rotor periphery having an axially extending opening therein adjacent said slot, said retainer means having a body portion rotatably and slidably mounted in said opening for rotation about the axis of the opening to a plurality of positions and sliding in a plurality of axial directions, said retainer means also having two circumferentially spaced head portions extending radially from said body portion, flange means extending axially from said rotor, said flange means and blade mounting portion each having a recess therein radially aligned with each other in the normal assembled condition of said blade and rotor and each adapted to contain one of said head portions therein in an axial movement preventing manner in one rotative position of said retainer means, the rotation of said retainer means to said one position preventing relative sliding movement in said directions between said blade, retainer means and rotor, rotation of said retainer means to another position withdrawing said head portions from said recesses, one of said head portions being deformable to prevent entry into or exit out of one recess to thereby prevent rotation of said retainer means.

References Cited in the file of this patent

UNITED STATES PATENTS

| | | |
|---|---|---|
| 2,753,149 | Kurti | July 3, 1956 |
| 2,801,074 | Brown | July 30, 1957 |
| 2,906,496 | Thompson | Sept. 29, 1959 |

FOREIGN PATENTS

| | | |
|---|---|---|
| 202,682 | Australia | July 19, 1956 |
| 1,062,938 | France | Dec. 9, 1953 |